(12) United States Patent
Mitzkus et al.

(10) Patent No.: US 9,741,122 B2
(45) Date of Patent: Aug. 22, 2017

(54) METHOD AND DEVICE FOR DETERMINING A DISTANCE BETWEEN TWO OPTICAL BOUNDARY SURFACES WHICH ARE SPACED APART FROM EACH OTHER ALONG A FIRST DIRECTION

(71) Applicant: Carl Zeiss Microscopy GmbH, Jena (DE)

(72) Inventors: Reiner Mitzkus, Goettingen (DE); Matthias Pospiech, Hannover (DE); Anke Vogelgsang, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/826,355

(22) Filed: Aug. 14, 2015

(65) Prior Publication Data
US 2016/0048967 A1 Feb. 18, 2016

(30) Foreign Application Priority Data

Aug. 14, 2014 (DE) .................... 10 2014 216 227

(51) Int. Cl.
| | |
|---|---|
| *G06T 7/00* | (2017.01) |
| *G02B 21/24* | (2006.01) |
| *G06K 9/46* | (2006.01) |
| *G06T 5/00* | (2006.01) |
| *G02B 21/00* | (2006.01) |

(Continued)

(52) U.S. Cl.
CPC .............. *G06T 7/0069* (2013.01); *G01B 9/04* (2013.01); *G01B 11/06* (2013.01);
(Continued)

(58) Field of Classification Search
CPC .......... G01B 9/04; G01B 11/06; G01B 11/25; G01B 11/2513; G02B 21/0016;
(Continued)

(56) References Cited

U.S. PATENT DOCUMENTS

| | | | | |
|---|---|---|---|---|
| 3,807,870 A | * | 4/1974 | Kalman | ................. G01B 11/06 250/559.28 |
| 4,564,296 A | * | 1/1986 | Oshida | ................... G01B 11/06 250/201.7 |

(Continued)

FOREIGN PATENT DOCUMENTS

| | | |
|---|---|---|
| DE | 10244767 A1 | 4/2004 |
| JP | 2005031507 A | 2/2005 |

OTHER PUBLICATIONS

Schaefer et al.: "Structured Illumination Microscopy: Artefact Analysis and Reduction Utilizing a Parameter Optimization Approach", Journal of Microscopy 216, 2004, pp. 165-174, 10 pages.

(Continued)

*Primary Examiner* — Jon Chang
(74) *Attorney, Agent, or Firm* — Skaar Ulbrich Macari, P.A.

(57) ABSTRACT

A method is provided for determining the distance between two optical boundary surfaces spaced apart from each other in a first direction. A first image is ascertained wherein the plane into which the pattern acquired coincides with a first of two optical boundary surfaces or has the smallest distance to the first optical boundary surface in a first direction. A position of the first image in the first direction is determined. A second image is ascertained wherein the plane into which the pattern acquired coincides with a second of two optical boundary surfaces or has the smallest distance to the second optical boundary surface in the first direction. The position of the second image in the first direction is determined. The distance is calculated by means of determined positions of the first and second image.

16 Claims, 8 Drawing Sheets

(51) Int. Cl.
G01B 9/04 (2006.01)
G01B 11/06 (2006.01)
G02B 21/36 (2006.01)

(52) U.S. Cl.
CPC ....... *G02B 21/0016* (2013.01); *G02B 21/244* (2013.01); *G02B 21/245* (2013.01); *G06K 9/4604* (2013.01); *G06T 5/003* (2013.01); *G02B 21/367* (2013.01); *G06T 2207/10028* (2013.01); *G06T 2207/10056* (2013.01); *G06T 2207/10148* (2013.01)

(58) Field of Classification Search
CPC .. G02B 21/244; G02B 21/245; G02B 21/367; G06K 9/4604; G06T 5/003; G06T 7/0069; G06T 7/004; G06T 7/0085; G06T 7/407; G06T 2207/10028; G06T 2207/10056; G06T 2207/10148; G06T 7/0051
USPC .................................. 382/103; 356/603, 604
See application file for complete search history.

(56) References Cited

U.S. PATENT DOCUMENTS

| | | | |
|---|---|---|---|
| 4,822,171 A * | 4/1989 | Brand | .................... G01B 11/06 356/632 |
| 5,604,344 A | 2/1997 | Finarov | |
| 6,043,475 A | 3/2000 | Shimada et al. | |
| 6,392,754 B1 | 5/2002 | Pingel et al. | |
| 6,563,634 B2 | 5/2003 | Shimada et al. | |
| 2003/0011677 A1 | 1/2003 | Spink | |
| 2003/0011789 A1* | 1/2003 | Shirley | ................. G01B 11/06 356/630 |
| 2008/0225416 A1 | 9/2008 | Harada et al. | |
| 2008/0292135 A1 | 11/2008 | Schafer et al. | |
| 2008/0310016 A1 | 12/2008 | Karasawa et al. | |
| 2010/0085636 A1 | 4/2010 | Berner | |
| 2011/0102572 A1 | 5/2011 | Kihara et al. | |
| 2012/0092461 A1 | 4/2012 | Fiskar et al. | |
| 2012/0127487 A1* | 5/2012 | Potapenko | ......... G01B 11/0691 356/632 |

OTHER PUBLICATIONS

Schaefer et al.: "Structured Illumination Microscopy: Improved Spatial Resolution Using Regularized Inverse Filtering", FOM 2006, Apr. 9-12, 2006, Perth, Australia, 1 page.

Strang, G.: "Computational Science and Engineering", Wellesley-Cambridge Press, 2007 (Chapter 3 and 4), 103 pages.

Gibson & Lanni (1992): Experimental Test of an Analytical Model of Aberration in an Oil-immersion Objective Lens Used in Three Dimensional Light Microscopy, JOSA, 9(1), 154ff, Jan. 1992, 13 pages.

* cited by examiner

METHOD AND DEVICE FOR DETERMINING A DISTANCE BETWEEN TWO OPTICAL BOUNDARY SURFACES WHICH ARE SPACED APART FROM EACH OTHER ALONG A FIRST DIRECTION

PRIORITY

This application claims priority to German Patent Application No. 102014216227.0, filed on Aug. 14, 2014, which is hereby incorporated herein by reference in its entirety.

FIELD

The present invention relates to a method and a device for determining the distance between two optical boundary surfaces spaced apart from each other in a first direction.

BACKGROUND

Determining the distance between two optical boundary surfaces spaced apart from each other in a first direction is of interest, for example, in the field of microscopy since the thickness of the cover glass in the case of embedded samples and the thickness of the base in the case of Petri dishes or sample vessels for inverted microscopy (such as e.g. multiwell plates, standard microplates, etc.) are important here in order to be able to carry out any necessary optical corrections, such as e.g. automatic focusing, and/or optical correction settings on microscope objectives. In particular, in respect of fully automated microscopic image acquisition processes it is increasingly important to know the thickness of the cover glass or the thickness of the base.

SUMMARY

An object of the invention includes providing a method for determining the distance between two optical boundary surfaces spaced apart from each other in a first direction which can be carried out automatically and without contact. Furthermore, a corresponding device for determining the distance between two optical boundary surfaces spaced apart from each other in a first direction is to be provided.

Disclosed is a method for determining the distance between two optical boundary surfaces spaced apart from each other in a first direction in which the following steps are carried out:
  a) imaging a pattern into a plane transverse to the first direction and acquiring an image of the pattern imaged in the plane,
  b) repeating step a) for different positions in the first direction, wherein the different positions cover an area in the first direction in which the two optical boundary surfaces lie,
  c) ascertaining a first image from the images from step a), wherein the plane into which the pattern acquired with the first image was imaged coincides with a first of the two optical boundary surfaces or has the smallest distance to the first optical boundary surface in the first direction in comparison with the planes in which the pattern acquired with the other images from step a) was imaged, and determining the position of the first image in the first direction,
  d) ascertaining a second image from the images from step a), wherein the planes into which the pattern acquired with the second image was imaged coincides with a second of the two optical boundary surfaces or has the smallest distance to the second optical boundary surface in the first direction in comparison with the planes in which the pattern acquired with the other images from step a) was imaged, and determining the position of the second image in the first direction, and
  e) calculating the distance by means of the determined positions in the first direction of the first and second image.

If a pattern is imaged in the first direction into the boundary surface of the bases of Petri dishes or sample vessels etc., the pattern is reflected proportionately at the boundary surfaces. By imaging this pattern, a clear separation from the image information and interference components independent thereof is possible by means of suitable image evaluation methods.

In the method according to the invention, the image can be ascertained in step c) and/or in step d) on the basis of conventional software autofocusing methods e.g. based on contrast and/or edge sharpness methods.

The pattern used in step a) can be a pattern in the form of a strip grating. Furthermore, the convolution in step c) and/or d) can be carried out in such a way that at least one column in the direction of the grating modulation of the strip-grating pattern of the respective image from step a) and the average value of several such columns or the sum of several such columns are taken into account in the convolution.

Furthermore, it is possible for the image to be ascertained in step c) and/or in step d) by means of a pattern-specific evaluation method e.g. by means of convolution of the respective image from step a) or a part thereof with a target pattern.

The target pattern can, for example, be simulated. It is also possible for the target pattern to be derived on the basis of the image ascertained in step c) and then used to ascertain the image in step d) by means of convolution.

In the method according to the invention, the mechanical distance of the two optical boundary surfaces can be calculated by multiplying the distance of the determined positions of the first and second image by the refractive index of the material present between the two optical boundary surfaces. In particular, the refractive index for the wavelength with which step a) is carried out is used.

Furthermore, for ascertaining the image in step c) and/or in step d) the images can be filtered.

Filtering is particularly preferred when the pattern is a grating which has a constant period in at least one direction. For example, the grating can be formed as a ruled grating.

In this case, the filtering can be carried out in the frequency domain. For this, the corresponding image can be transformed into the frequency domain, a bandpass filtering can be carried out in the frequency domain, wherein the bandpass range is set to the grating frequency, and the filtered image is then transformed back into the object space.

The pattern can also, for example, be a type of chessboard pattern. In this case, only a row or column of the chessboard pattern which has e.g. a constant period can be used for the evaluation. Of course, several lines or columns, which preferably run in parallel, can also be used for the evaluation.

It is thus possible according to the invention to use only a part of the imaged pattern in the acquired image to ascertain the desired images.

In the method according to the invention, the different positions according to step b) can be spaced equidistantly. However, it is also possible for the distances not to be constant.

In particular, in the method according to the invention, the different positions according to step b) can have a smaller distance in a first area around at least one of the two optical boundary surfaces in comparison with a second area adjacent to the first area. Thus it is possible to pass through the first areas, in which the optical boundary surfaces lie, in the first direction with quasi higher resolution. The areas (first and second) can, for example, be determined from known data (if e.g. it is known what type of cover glass or Petri dish is being used) or from a first scanning pass with a large step width. The scanning pass can involve the acquisition of a z-stack in the same way as with steps a) and b). However, any other way of acquiring several images in different positions in the first direction is also possible.

Thus, in the method according to the invention, the different positions according to step b) can be passed at a different step width, wherein a smaller step width is used around the expected positions of the optical boundary surfaces than between the expected positions of the optical boundary surfaces. These operations can also take place several times separately and iteratively in order to increase the accuracy.

Moreover, in the method according to the invention, steps a) and b) can be carried out with at least two different wavelength ranges to image the pattern, wherein in step e) the distance is then calculated for both wavelength ranges (distance of the centroid wavelength of the wavelength ranges). If it is known that the two optical boundary surfaces border either only a first or a second material with different optical properties, the material which is actually present can be determined on the basis of the two wavelength-dependent distances.

For this, it is possible, for example, to compare the amount of the difference of the mechanical thickness of a material for both effective wavelengths with the amount of the difference of the mechanical thickness of the other material for both effective wavelengths and to derive therefrom which material is present. The mechanical thickness is thus calculated for both effective wavelengths under the assumption that either the first or the second material is present. The difference of the mechanical thicknesses for the respective material is then generated and the amounts thereof are compared. The material the amount of which has the smaller value is the material which is actually present. In this way, a determination of material can be carried out automatically.

The pattern can preferably be a pattern in the form of a strip grating. In this case, the pattern has a period in only one direction and is thus intensity-modulated in one direction.

However, it is also possible for the pattern to be in the form of a grating and to have the same or different periods in two different directions.

In the method according to the invention, the imaged pattern is preferably imaged magnified in step a).

Furthermore, a method is provided for determining the position of a first optical boundary surface in which the following steps are carried out:
   a) imaging a pattern into a plane parallel to the first optical boundary surface and acquiring an image of the pattern imaged in the plane,
   b) repeating step a) for different positions of the plane, wherein the different positions cover an area in which the first optical boundary surface lies,
   c) ascertaining a first image from the images from step a), wherein the plane into which the pattern acquired with the first image was imaged coincides with the first optical boundary surface or has the smallest distance to the first optical boundary surface in comparison with the planes in which the pattern acquired with the other images from step a) was imaged, and
   d) determining the position of the first optical boundary surface by means of the ascertained first image.

The method for determining the position of a first optical boundary surface can be further developed in such a way that the distance of the first optical boundary surface to a second optical boundary surface is determined. Known methods such as software autofocusing methods can also be used for the determination of the position of the second optical boundary surface. It is also possible to carry out the same method as for the determination of the first optical boundary surface with steps a)-d). The positions of the two optical boundary surfaces can be determined offset laterally with respect to each other. The desired distance can then be ascertained by means of the position of the two optical boundary surfaces.

The method for determining the position of a first optical boundary surface can have the same features and further developments as the method already described for determining a distance between two optical boundary surfaces spaced apart from each other in a first direction (including further developments thereof).

A method is further provided for determining the distance between two optical boundary surfaces spaced apart from each other in a first direction in which the following steps are carried out:
   a) imaging a pattern into a plane transverse to the first direction and acquiring an image of the pattern imaged in the plane,
   b) repeating step a) for different positions of the first direction, wherein the different positions cover an area in the first direction in which a first of the two optical boundary surfaces lies,
   c) ascertaining the position in the first direction of the second optical boundary surface using an optical method,
   d) ascertaining a first image from the images from step a), wherein the plane into which the pattern acquired with the first image was imaged coincides with the first optical boundary surface or has the smallest distance to the first optical boundary surface in comparison with the planes in which the pattern acquired with the other images from step a) was imaged, and determining the position of the first image in the first direction, and
   e) calculating the distance by means of the positions from steps c) and d).

Known optical methods, such as e.g. methods for ascertaining the focus position (e.g. autofocus methods) can be used for the determination of the position of the second optical boundary surface according to step c).

The first direction is, in the methods according to the invention, in particular perpendicular to the optical boundary surfaces. However, it can also have an angle which is not equal to 90° with at least one of the optical boundary surfaces. This is the case in particular when the two optical boundary surfaces are not aligned parallel to each other. The two optical boundary surfaces are preferably parallel to each other.

By step a) of imaging a pattern transverse to the first direction in the methods according to the invention is meant in particular that the pattern is thus imaged in a plane parallel to the first or second optical boundary surface. This plane can, of course, also coincide with the first or second optical boundary surface.

For example, the position of the selected first or second image or the plane into which the pattern acquired with the selected first or second image was imaged can be used for the determination of the position of the first and second image according to steps c) and d), respectively. The position of the optical boundary surface is thus determined in this area with a maximum error which corresponds to the step width used. Furthermore, in steps c) and d) the position of the first or second optical boundary surface can be determined with greater accuracy by interpolating starting from the determined first or second image. For example, it is possible to use both images which include the first or second optical boundary surface (in the first direction; the first or second boundary surface lies between both images in the first direction) and, on the basis thereof, to determine the position of the first or second optical boundary surface with greater accuracy by interpolating between these two images. In this case, these two images can be determined respectively, for example, in steps c) and d).

The disclosed methods can be applied in particular in the field of microscopy. Particularly preferably e.g. a thickness of a cover glass or the thickness of a base of a Petri dish or of another sample vessel for inverted microscopy (such as e.g. multiwell plates, microtitre plates etc.) can thus be determined.

By the determination of the distance is meant in particular here the determination of the mechanical distance and/or of the optical distance (d/n; d=thickness; n=refractive index of the material between the two optical boundary surfaces).

The disclosed methods can be used in particular in the field of the microscopic observation and analysis of biological and/or medical samples. In this field, aqueous samples are often observed microscopically over a longer period (hours to days). To set the microscope objective correctly it is often necessary to know the optical path length between the sample and the objective exactly. With the methods according to the invention, the distance between two optical boundary surfaces and thus e.g. the cover glass thickness which is not known exactly can be determined, with the result that e.g. it is possible to carry out such settings on a microscope or another optical measurement system, which make possible an optical imaging or an optical measurement with the highest possible quality. In particular, this can take place automatically.

The imaging of the pattern according to step a) in the methods according to the invention leads to a structured illumination which can also be described as intensity-modulated illumination. In particular, the pattern is imaged in a limited wavelength range.

The pattern is preferably generated in a plane conjugate to the focal plane during acquisition and is thus imaged sharply into the focal plane.

The disclosed methods can be used in particular in reflected light or transmitted light microscopes.

Furthermore, a device is provided for determining the distance between two optical boundary surfaces spaced apart from each other in a first direction and/or for determining the position of an optical boundary surface, which device has an illumination module for imaging a pattern in a plane transverse to the first direction, an imaging module for acquiring an image of the pattern imaged in the plane and a control module which is formed to carry out the steps of the method according to the invention (including further developments thereof).

In particular, the device can be formed as a microscope. Thus it can, for example, be formed as a reflected light microscope or a transmitted light microscope.

It is understood that the features mentioned above and those yet to be explained in the following are applicable, not only in the stated combinations, but also in other combinations or singly, without departing from the scope of the present invention.

DETAILED DESCRIPTION

The present invention can be explained with reference to the following example embodiments. However, these example embodiments are not intended to limit the present invention to any specific examples, embodiments, environments, applications or implementations described in these embodiments. Therefore, description of these embodiments is only for purpose of illustration rather than to limit the present invention.

Figure 1:
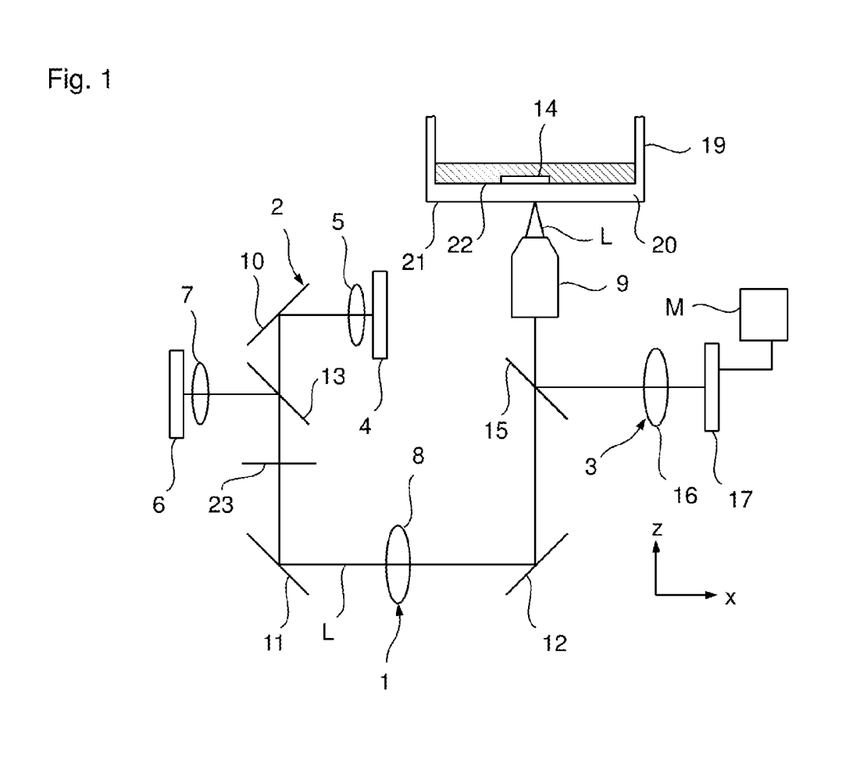
FIG. 1 is a schematic representation of the structure of an embodiment of the device 1 according to the invention for determining the distance between two optical boundary surfaces spaced apart from each other in a first direction.

The structure of an embodiment of the device 1 according to the invention for determining the distance between two optical boundary surfaces spaced apart from each other in a first direction is shown schematically in FIG. 1. In this embodiment, the device 1 is formed as an inverted microscope which comprises an illumination module 2 and an imaging module 3. The illumination module 2 can e.g. have a first light source 4 with a first lens system 5, a second light source 6 with a second lens system 7, an illumination lens system 8 and an objective 9. The first light source 4 can e.g. emit light with an effective wavelength of 420 nm and the second light source 6 can e.g. emit light with an effective wavelength of 625 nm. In principle, light with a wavelength from the visible wavelength range, from the infrared range or from the UV range can be used. Furthermore, deflecting mirrors 10, 11 and 12 and a beam combiner 13 are also provided, with the result that, preferably selectively, the light L of the first or second light source 4, 6 can be directed onto a sample 14 via the illumination lens system 8 and the objective 9 for illumination.

The imaging module 3 comprises the objective 9, a beam splitter 15, an imaging lens system 16 and a camera 17. A (preferably magnified) image of the sample 14 can thus be acquired with the camera 17 via the objective 9, the beam splitter 15 and the imaging lens system 16.

Furthermore, the device 1 also has a control module M which controls the device during operation and carries out the evaluation and determination of distance described below. The control module M can be part of the device 1, be formed as a separate module or be a combination of the two.

Figure 2:
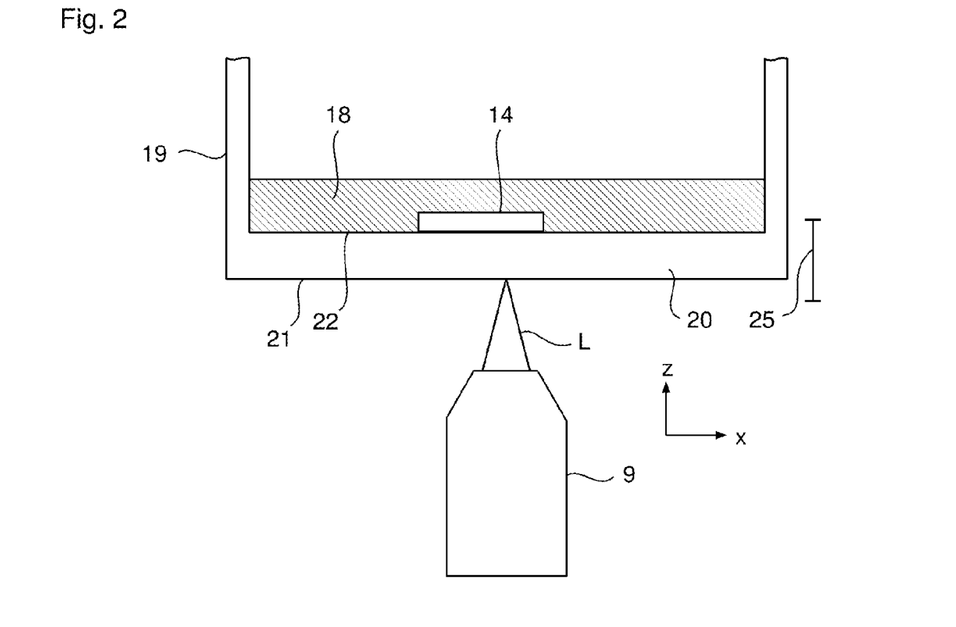
FIG. 2 is an enlarged representation of the objective 9 and the sample 14 of the device 1 from FIG. 1.

An enlarged representation of the objective 9 and the sample 14 is shown in FIG. 2. The sample 14 can e.g. be a cell sample which floats in a liquid medium 18 which is held in a Petri dish 19. After the sample 14 has been imaged through the base 20 of the Petri dish 19, it is necessary, for high-quality imaging, to know the exact thickness of the base 20 in order to be able to take it into account during the imaging.

The thickness of the base 20 and thus the distance from the lower boundary surface 21 of the base 20 to the upper boundary surface 22 of the base 20 can be determined as follows.

Figure 3:
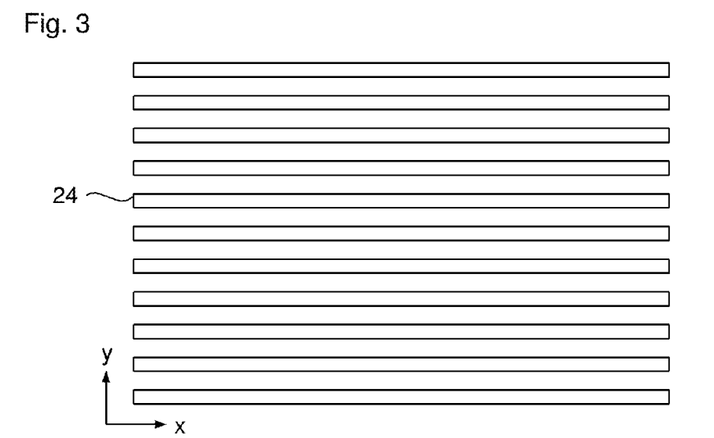
FIG. 3 is a schematic representation of the strip grating 24 which is to be imaged into the focal plane.

A strip grating 24 (as represented schematically in FIG. 3) is arranged in a plane 23 (FIG. 1) conjugate to the focal plane of the imaging module 3 within the illumination module 2, with the result that a corresponding illumination structure in the form of a strip grating is present in the focal plane. Several acquisitions are made with this illumination by means of the imaging module 3, wherein the acquisitions take place at different z-positions. A so-called z-stack is thus acquired. The z-positions are chosen such that they cover a z-area 25 within which both the lower boundary surface 21 and the upper boundary surface 22 lie. Since refractive index discontinuities are present at these boundary surfaces 21 and 22, reflections occur here, wherein interfering light can occur at other points inside or outside the base 20. The reflections are used to ascertain the distance between the lower and upper boundary surfaces 21, 22 with great accuracy.

At the lower boundary surface 21, the refractive index discontinuity is present because of the transition between the material of the surroundings (for example, air) and the material of the base 20 of the Petri dish 19 and, at the upper boundary surface 22, the refractive index discontinuity is present because of the transition between the material of the base 20 of the Petri dish 19 and the medium 18.

In the microscope 1 according to the invention, a pre-determined z-area 25 is thus passed through (the focal plane is shifted in the z-direction), wherein there is always a sharp image of the strip grating in the focal plane and thus the desired illumination structured in the form of strips. Passing through the pre-determined z-area can take place with equidistant steps, for example.

Figure 4:
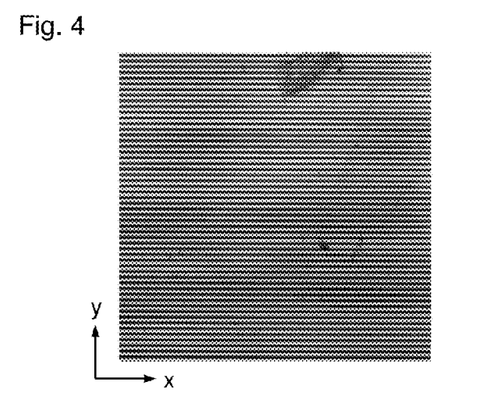
FIG. 4 is an acquisition of the image of the reflex at the lower boundary surface of the base 20 of the Petri dish 19.
Figure 5:
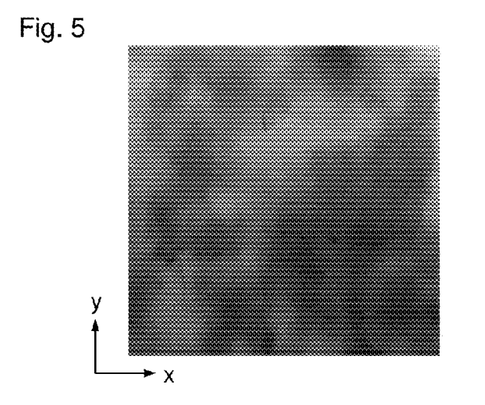
FIG. 5 is an acquisition of the reflex at the upper boundary surface of the base 20 of the Petri dish 19.

The acquisition of the camera 17 of the imaging module 3 when the focal plane coincides with the lower boundary surface 21 is shown in FIG. 4. The corresponding acquisition when the focal plane coincides with the upper boundary surface 22 is shown in FIG. 5. Since the two acquisitions are normalized to maximum image contrast, the intensity differences which are actually present cannot be distinguished. The intensity of the acquisition according to FIG. 4 is significantly greater than in the case of the acquisition according to FIG. 5. In particular, the contrast is greater in the acquisition of the lower boundary surface 21 than in the other acquisitions. As a consequence of the different imaging properties, the images of the pattern from the boundary surfaces can differ from each other both in intensity and in contrast.

Figure 6:
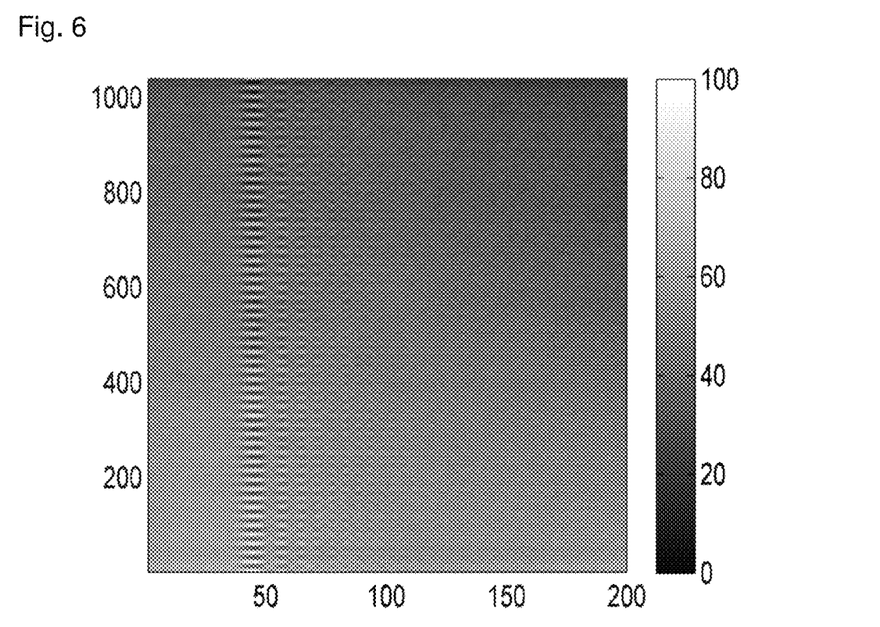
FIG. 6 is a representation of a y-z section through a z-acquisition stack in the area of the lower boundary surface 21.

Moreover, the effect occurs that the grating 24 is sharply imaged if e.g. the focal plane coincides with the lower boundary surface 21. As the distance of the focal plane from the lower boundary surface increases, the grating 24 becomes blurred in the acquisition, wherein the grating pattern recurs with the same period and has a decreasing contrast in each repetition. This is illustrated in FIG. 6 in which the z-position is imaged along the x-axis and the acquired grating in a direction perpendicular to the longitudinal direction of the strips of the strip grating is imaged along the y-axis. This representation of a y-z section through a z-stack over a range of 200 µm with a resolution of 1 µm shows that the grating structure is imaged sharply at approximately 45 µm (thus the lower boundary surface 21 lies here) and that the grating structure subsequently repeats at periodic distances with lower intensity.

The same behavior occurs in the area of the upper boundary surface 22 (with lower intensity and lower contrast).

Figure 7:
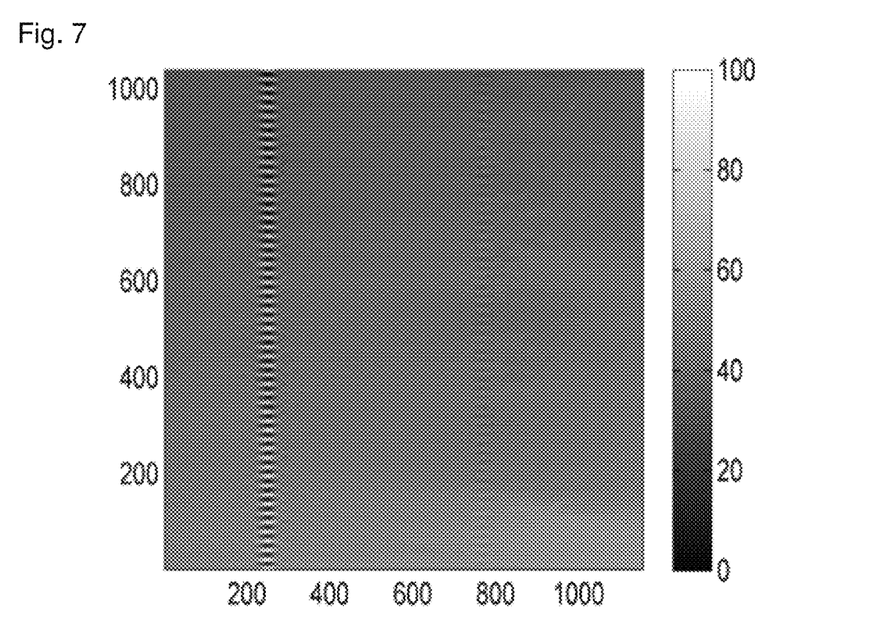
FIG. 7 is a y-z section through a z-acquisition stack over the whole thickness of the base 20 of the Petri dish 19.

Only an area around the lower boundary surface is shown in FIG. 6. In the same way as in FIG. 6, a y-z section through the lower glass-air boundary surface (lower boundary surface 21) and the upper glass-medium boundary surface (upper boundary surface 22) is shown in FIG. 7. At approx. 220 µm the grating reflex at the lower boundary surface 21 is distinguished with a high reflectance and thus very good contrast in the imaging. At approx. 780 µm, the comparatively weak reflex of the upper boundary surface 22 is to be distinguished. Typical software methods for determining the focus (subsequently also called focus function) can be used in order to ascertain the positions of the sharply imaged grating structure from these data. From the positions, the distance between the two boundary surfaces 21, 22 in a first direction (here the z-direction) can then be ascertained.

Figure 8:
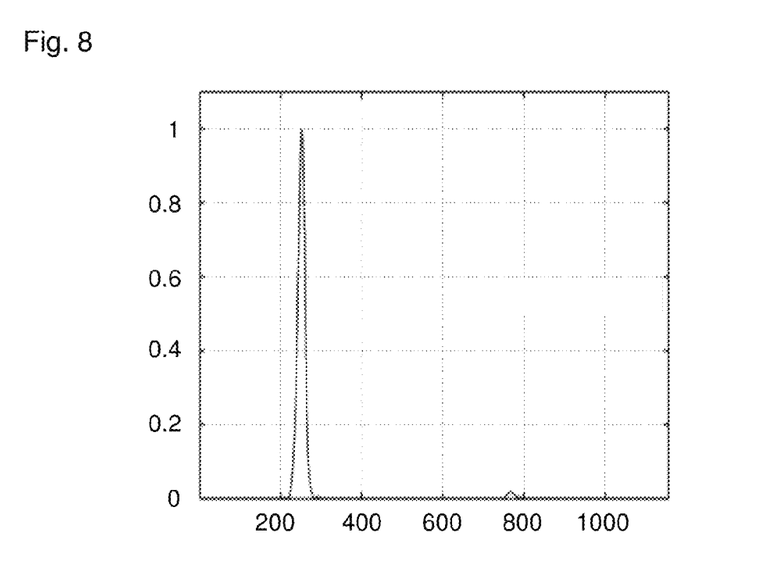
FIG. 8 is a focus function derived from FIG. 7.

A corresponding evaluation with a focus function is shown in FIG. 8. The following function F(z) according to equation 1

$$F(z)=\Sigma\Sigma|g(x,y+d)-2g(x,y)+g(x,y-d)|^2 \qquad (1)$$

can be used (g(x,y) is the image to be evaluated and d=5). This variant is based on a detection of high edge sharpness and is known by the name second order squared gradient. In FIG. 8, the z-position in µm is plotted along the x-axis and the normalized focus function is plotted along the y-axis.

It can be seen that the signal level at the upper boundary surface 22 lies only just above the base level and is therefore difficult to differentiate from the background.

In some circumstances, the examination of the images with functions for contrast steepness and edge sharpness can thus not be sensitive enough to detect the grating structure at the upper boundary surface 22.

A better evaluation can be achieved by convolving at least one column in the direction of the grating modulation (in y-direction in FIGS. 4 and 5) or the average of several columns (alternatively the sum of a particular number k of columns) of the acquired image with an expected grating structure (also called target grating signal) according to equation 2 below.

$$\text{Convolution}(x, y) = \frac{\sum_y (\text{Signal}(x, y, z) * \text{Grating}(y))}{\sum_y \text{Signal}(x, y, z) + \sum_y \text{Grating}(y)} \quad (2)$$

In equation 2, Signal (x, y, z) means the at least one column of the acquired image and Convolution (x, y) means the received convolution signal. Instead of the at least one column, an average or the sum of several columns of the acquired image can be used as Signal (x, y, z) for the convolution according to equation 2. The averaging and the summation are carried out transverse to the direction of the grating modulation and thus in the x-direction in FIGS. 4 and 5. Of course, the completely acquired image can also be used as Signal (x, y, z) in equation 2.

Figure 9:
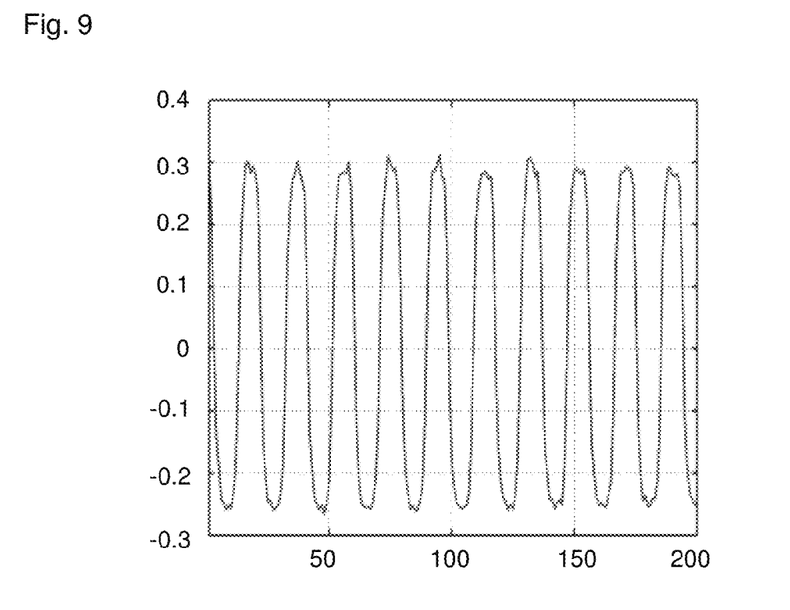
FIG. 9 is a profile line generated from a maximum image, which is ascertained from the focus function according to FIG. 8.

The expected grating structure (Grating (y)) can be generated e.g. on the basis of the reflex image of the lower boundary surface 21. This reflex image can be determined by the focus function described above. Thereafter a profile line is generated by means of this maximum image and processed such that it is centred on zero (FIG. 9). In FIG. 9, the spatial coordinate of the profile line (in pixels of the acquired image) is plotted along the x-axis and the normalized intensity is plotted along the y-axis. A target grating signal which is used for the convolution is then calculated from the processed signal. This target grating signal can have the pattern shown in FIG. 10. The spatial coordinate of the profile line (in pixels of the acquired image) is plotted along the x-axis and a signal value normalized to 1 is plotted along the y-axis.

Figure 10:
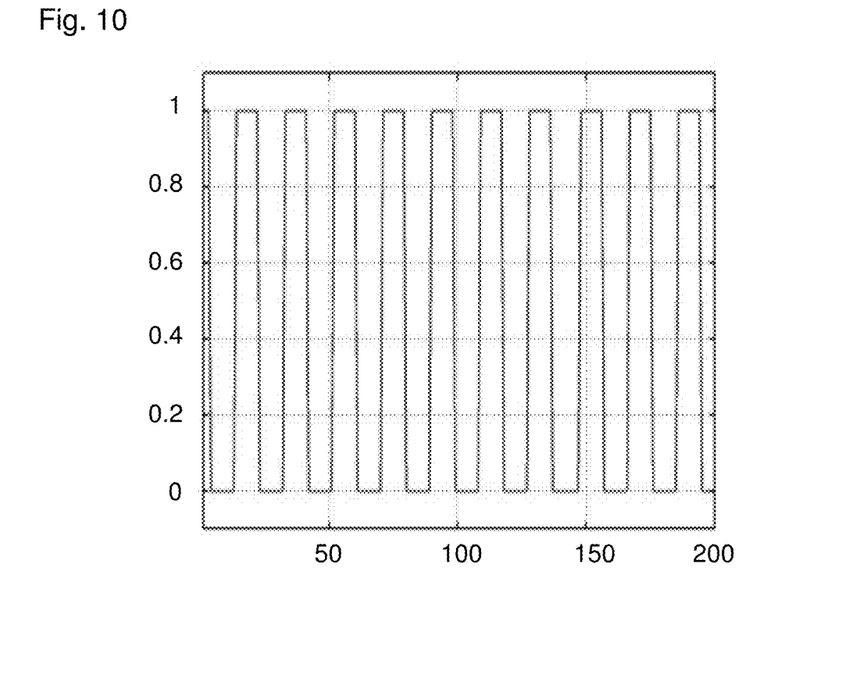
FIG. 10 is a target grating signal which is derived from the data according to FIG. 9.
Figure 11:
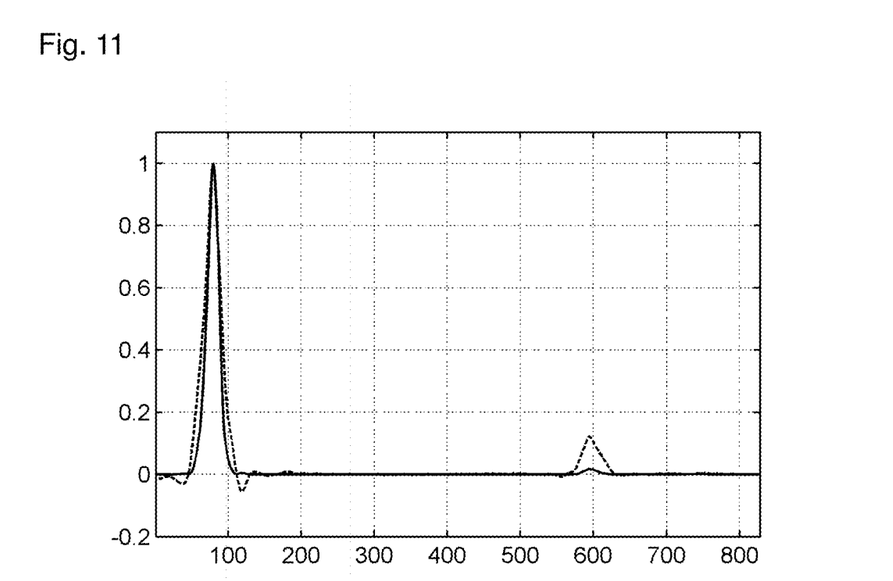
FIG. 11 is a comparison of the focus signal with the convolved intensity pattern over z with the target grating.

If the convolution signal is now evaluated on the basis of this target grating according to FIG. 10, a clearly detectable signal is obtained in particular in the area of the reflex for the upper boundary surface 22. This is represented schematically in FIG. 11, wherein the focus function is represented with a solid line and the convolution signal with a dashed line. In the representation in FIG. 11 the z-position in μm is plotted along the x-axis and a function value normalized to 1 is plotted along the y-axis.

Figure 12:
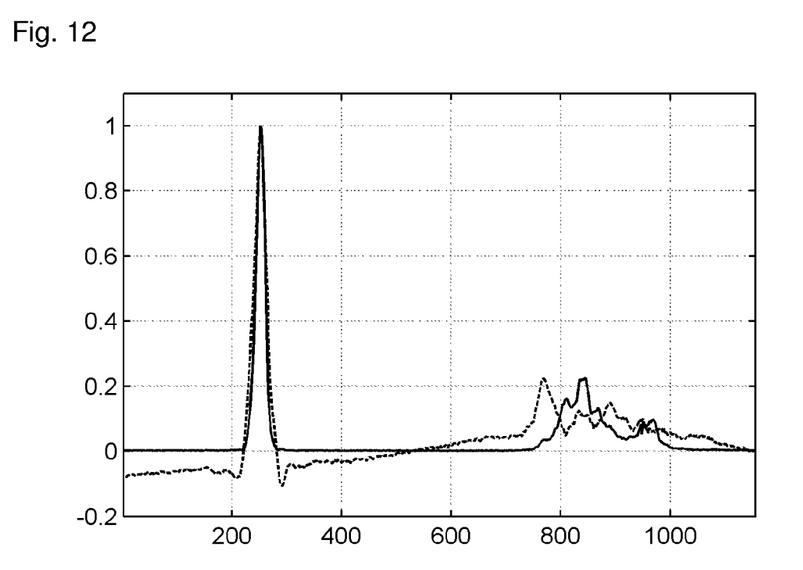
FIG. 12 is a further comparison according to FIG. 11.

A further advantage of the convolution is that a signal is obtained which is essentially only sensitive to the imaging of the pattern. Other structures with high contrast or quite general luminance fluctuations have little or no influence on the evaluation. This can be seen in FIG. 12, in which the convolution signal represented as a dashed line has a local maximum at the upper boundary surface 22. The cells (sample 14) are clearly distinguished above the upper boundary surface 22 by means of the focus function (represented by a solid line). In this example, an evaluation based only on the focus function would lead to an incorrect position of the upper boundary surface 22. In the representation in FIG. 12, in the same way as in the representation in FIG. 11, the z-position in μm is represented along the x-axis and the function value normalized to 1 is represented along the y-axis.

Although the contrast of the grating image is strengthened by the evaluation of the convolution, the contrast has a linear influence on the signal. Correspondingly, if there is almost no signal from the grating any longer, the signal level of the convolution function is correspondingly weak. According to the invention, the wavelength range for the illumination is therefore chosen as far as possible so as to ensure a good contrast of the grating image. For this, a suitable light source can be selected.

Figure 13:
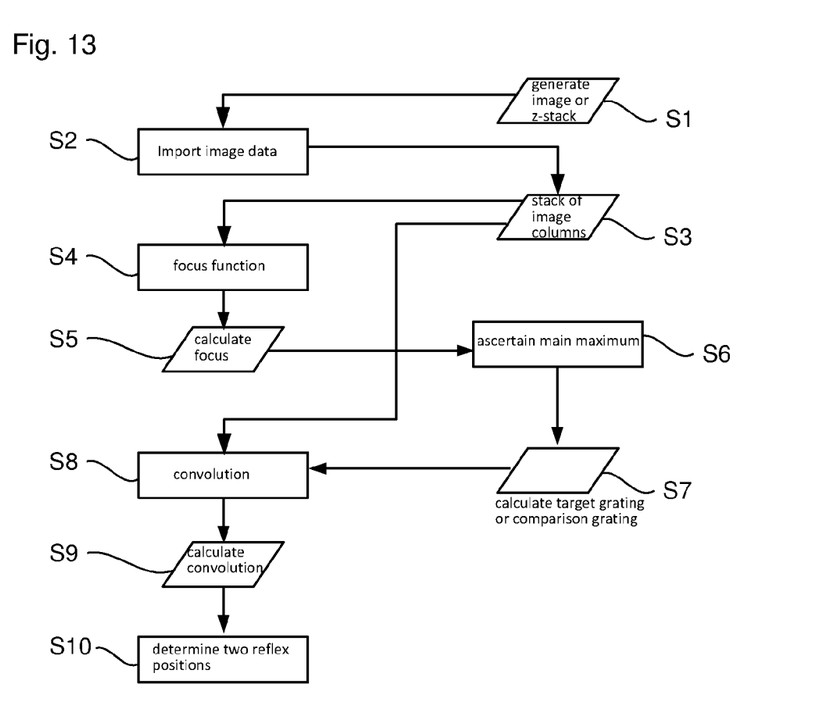
FIG. 13 is a flow diagram for the method according to the invention.

In the flow diagram according to FIG. 13, the described procedure is represented again.

In step S1 an image stack or z-stack is generated. These image data are imported in step S2, wherein the actual z-position is measured and e.g. a central column is selected in order thus in step S3 to have a stack of image columns S(z).

In step S4 the focus function which is available in step S5 is calculated from the stack of image columns S(z).

In step S6 the main maximum is ascertained and then in step S7 the target grating or comparison grating G is calculated.

In step S8, the convolution which is available in step S9 is calculated on the basis of the stack of image data S(z) with the comparison grating G. On the basis of the calculated convolution, in step S10 the two reflex positions are then determined.

By means of the reflex positions, the distance of the focus positions Δz can be determined and thus the distance between the lower and the upper boundary surfaces 21 and 22 can be calculated.

If the material of the base 20 of the Petri dish 19 is known, the thickness of the base d can be calculated using Δz·n, wherein Δz is the difference of the z-positions between the sharp grating images and n is the refractive index of the base as a function of the wavelength of the illumination system used.

For applications in the biological field, as a rule only two materials are used. Either glass with the designation D263M or the plastic polystyrene (PS) is used. These materials differ in terms of dispersion, which can be used to be able to automatically differentiate these materials and thus to ascertain the material.

The following process can be used to ascertain the material. First, Δz is ascertained for a first wavelength and then for a second wavelength, which differ from each other significantly. For example, 420 nm and 625 nm can be used as first and second wavelength. The difference in the thus-ascertained thicknesses for a material must be approximately zero. If the difference of the two thicknesses for the material D263M is now compared with the difference of the two thicknesses for the material polystyrene, one difference is smaller in terms of amount than the other. The difference which is smaller in terms of amount reveals the material which is actually present. Therefore, if the amount of the difference of the thicknesses for polystyrene for both wavelengths is smaller than the amount of the difference for the glass D263M, it is polystyrene.

In the case of embedded samples 14, the refractive index of the embedding medium 18 can be so close to the refractive index of the cover glass that the reflex is so weak that no grating image can be evaluated.

Figure 14:
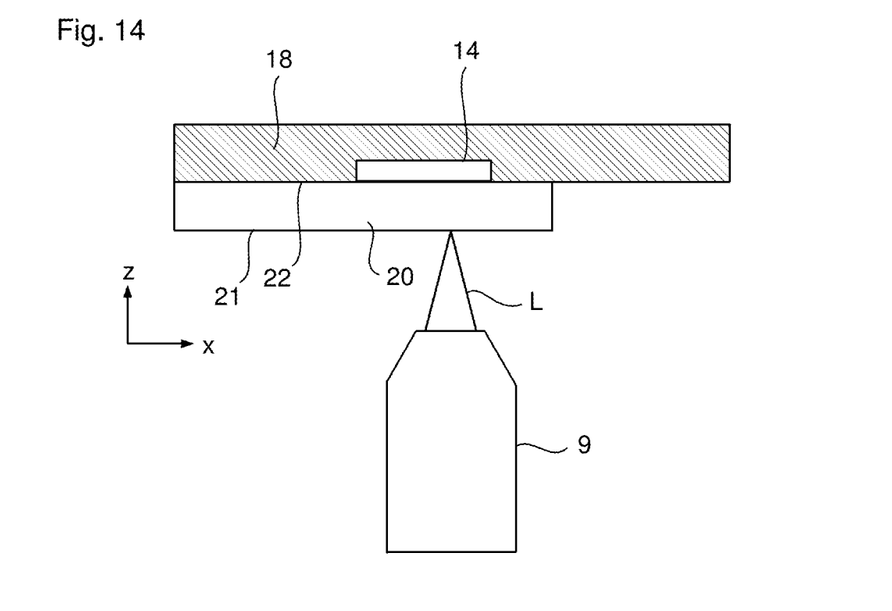
FIG. 14 is a representation according to FIG. 2 to explain a further embodiment.

In this case, as is shown in FIG. 14, the upper boundary surface can be ascertained laterally offset at a position at which no cover glass is present, with the result that here too there is e.g. a boundary surface between air and the object slide. In other respects, the upper boundary 22 can be determined in the same way as described previously.

Figure 15:
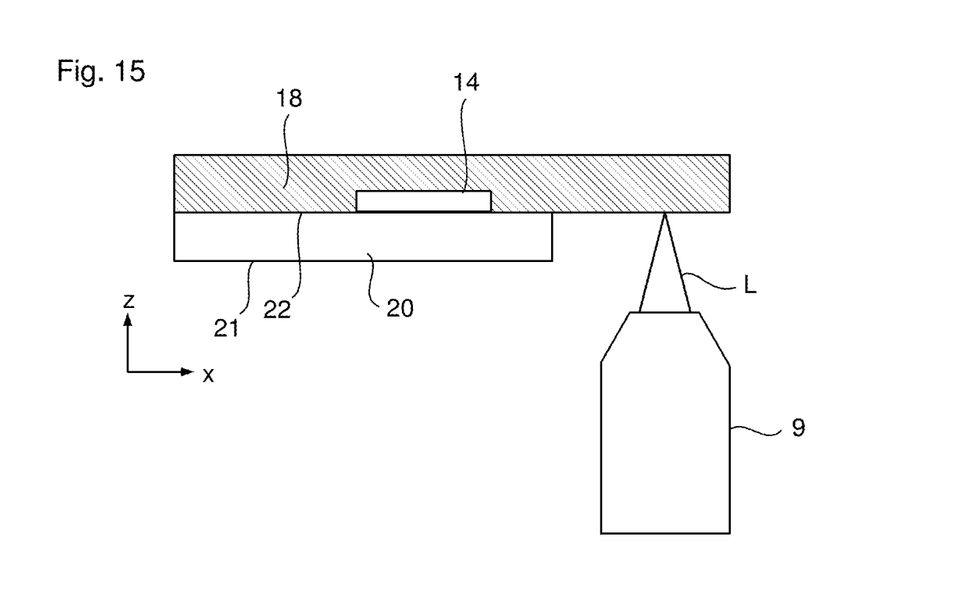
FIG. 15 is a representation according to FIG. 14 to explain the further embodiment.

Alternatively, referring to FIG. 15, it is possible to determine the upper boundary surface 22 by using a conventional software autofocus which focuses on the plane in which the sample lies. Because the sample 14 lies at the upper boundary surface 22 as a rule, the position of the upper boundary surface 22 can thus also be determined.

Figure 16:
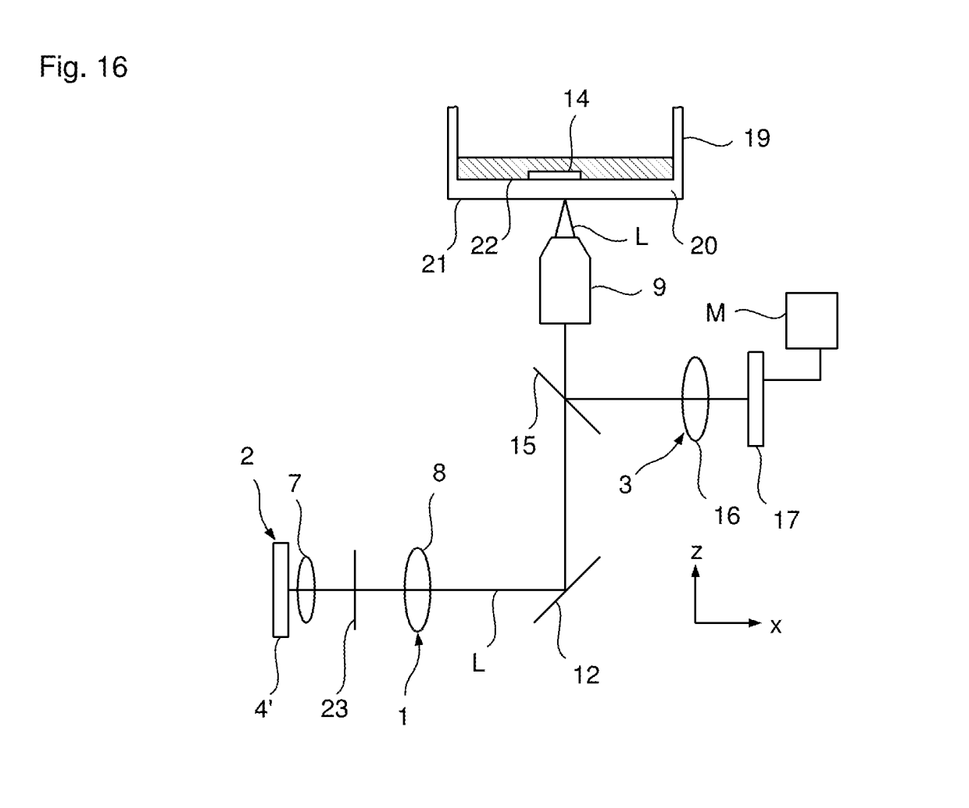
FIG. 16 is a schematic representation of a further embodiment of the device 1 according to the invention.

A further embodiment of the device 1 according to the invention for determining the distance between two optical boundary surfaces spaced apart from each other in a first direction is shown in FIG. 16, wherein identical elements of the device 1 in comparison with the previously described device 1 are given identical reference numbers and reference is made to the above statements for a description thereof. The device 1 according to FIG. 16 differs from the device 1 according to FIG. 1 essentially in that the illumination module 2 only has a first light source 4' with the first lens system 5, with the result that the deflecting mirrors 10, 11 and the beam combiner 13 can be dispensed with. The first light source 4' is formed such that it can selectively emit light with a first effective wavelength and a second effective wavelength.

The light sources 4, 5, 4' can e.g. be LEDs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for determining the distance between two optical boundary surfaces spaced apart from each other in a first direction, the method comprising:
   a) imaging a pattern into a plane transverse to the first direction and acquiring an image of the pattern imaged in the plane;
   b) repeating step a) for a plurality of different positions in the first direction, wherein the different positions cover an area in the first direction in which the two optical boundary surfaces lie;
   c) ascertaining a first image from the images from step a), wherein the plane into which the pattern acquired with the first image was imaged either coincides with a first of the two optical boundary surfaces or has the smallest distance to the first optical boundary surface in the first direction in comparison with the planes in which the pattern acquired with the other images from step a) was imaged;
   c1) determining the position of the first image in the first direction;
   d) ascertaining a second image from the images from step a), wherein the plane into which the pattern acquired with the second image was imaged either coincides with a second of the two optical boundary surfaces or has the smallest distance to the second optical boundary surface in the first direction in comparison with the planes in which the pattern acquired with the other images from step a) was imaged;
   d1) determining the position of the second image in the first direction; and
   e) calculating the distance based upon the determined positions of the first and second image.

2. The method according to claim 1, wherein in at least one of steps c) and d), one or both of the first and second images is ascertained on the basis of one or both of contrast and edge sharpness.

3. The method according to claim 1, wherein in at least one of step c) and d), one or both of the first and second images is ascertained by a convolution of the respective image from step a), or a partial image generated therefrom, with a target pattern.

4. The method according to claim 3, wherein the target pattern used for the convolution, is derived based upon the first image ascertained in step c).

5. The method according to claim 1, wherein in step a) a pattern in the form of a strip grating is used.

6. The method according to claim 1, wherein:
   in one or both of steps c) and d), at least one of the first and second images is ascertained by a convolution of the respective image from step a), or a partial image generated therefrom, with a target pattern;
   in step a) a pattern in the form of a strip grating is used; and
   in one or both of steps c) and d), at least one column in the direction of a grating modulation of the strip-grating pattern of the respective image from step a), the average value of several such columns, or the sum of several such columns, are utilized in the convolution.

7. The method according to claim 1, wherein the images from step a) are filtered to ascertain one or both of the first and second images in one or both of steps c) and d).

8. The method according to claim 1, wherein the different positions according to step b) are spaced equidistantly.

9. The method according to claim 1, wherein the different positions according to step b) have smaller distances in a first area around the first optical boundary surface in comparison with a second area adjacent to the first area.

10. The method according to claim 9, wherein the different positions according to step a) have smaller distances in a third area around the second optical boundary surface in comparison with the second area which lies between the first and third area.

11. The method according to claim 1, wherein steps a) and b) are carried out for at least two different wavelengths to image the pattern, wherein in step e) the distance of the boundary surfaces is calculated for each of the at least two different wavelengths and, on the basis of the at least two distances calculated, it is ascertained which of at least two possible materials, which are bordered by the at least two optical boundary surfaces, is present.

12. The method according to claim 11, wherein a dispersion of the material is used in conjunction with the positions of the boundary surfaces at the different wavelengths to determine the material.

13. The method according to claim 12, wherein, in determining which material is present, an amount of a difference of mechanical thicknesses of a first material for each of the at least two different wavelengths is compared with an amount of a difference of mechanical thicknesses of a second material for each of the at least two different wavelengths and a determination is made for which material is present based upon a comparison of the amount of differences of mechanical thicknesses of the first and second materials.

14. The method according to claim 11, wherein, in determining which material is present, an amount of a difference of mechanical thicknesses of a first material for each of the at least two different wavelengths is compared with an amount of a difference of mechanical thicknesses of a second material for each of the at least two different wavelengths and a determination is made for which material is present based upon a comparison of the amount of differences of mechanical thicknesses of the first and second materials.

15. The method according to claim 1, wherein a mechanical distance of the two optical boundary surfaces is calculated by multiplying the distance of the determined positions of the first and second image by the refractive index of the material present between the two optical boundary surfaces.

16. A device for determining the distance between two optical boundary surfaces spaced apart from each other in a first direction, the device comprising:
- an illumination unit configured to image a pattern into a plane transverse to the first direction;
- an imaging unit configured to acquire an image of the pattern imaged in the plane; and
- a controller configured to carry out the steps of claim 1.

* * * * *